(12) United States Patent
Bányai et al.

(10) Patent No.: US 11,061,540 B2
(45) Date of Patent: Jul. 13, 2021

(54) REMOTE SUPPORT SERVICE WITH SMART WHITEBOARD

(71) Applicant: LogMeIn, Inc., Boston, MA (US)

(72) Inventors: Sándor Balázs Bányai, Budapest (HU); András Sulykos, Budapest (HU)

(73) Assignee: LogMeIn, Inc., Boston, MA (US)

( * ) Notice: Subject to any disclaimer, the term of this patent is extended or adjusted under 35 U.S.C. 154(b) by 395 days.

(21) Appl. No.: 14/601,267

(22) Filed: Jan. 21, 2015

(65) Prior Publication Data

US 2016/0210006 A1    Jul. 21, 2016

(51) Int. Cl.
*G06F 3/0484*  (2013.01)
*H04L 29/08*  (2006.01)
*G06F 3/0488*  (2013.01)

(52) U.S. Cl.
CPC .......... *G06F 3/0484* (2013.01); *G06F 3/0488* (2013.01); *H04L 67/10* (2013.01); *H04L 67/125* (2013.01)

(58) Field of Classification Search
None
See application file for complete search history.

(56) References Cited

U.S. PATENT DOCUMENTS

| | | | | |
|---|---|---|---|---|
| 6,339,431 | B1 * | 1/2002 | Ohmori | G06F 3/0481 345/585 |
| 9,026,900 | B1 * | 5/2015 | Pugh | G06F 40/166 715/227 |
| 2008/0074424 | A1 * | 3/2008 | Carignano | G06T 13/80 345/473 |
| 2011/0057875 | A1 * | 3/2011 | Shigeta | G06F 3/011 345/156 |
| 2013/0114849 | A1 * | 5/2013 | Pengelly | G06F 17/289 382/103 |
| 2013/0235400 | A1 * | 9/2013 | Conlon | G06K 15/16 358/1.12 |
| 2014/0375572 | A1 * | 12/2014 | Shanmugam | G06F 3/0484 345/173 |

(Continued)

OTHER PUBLICATIONS

Author: Steffen Gauglitz. Title: World-Stabilized Annotations and Virtual Scene Navigation for Remote Collaboration. Publication Date: Oct. 8, 2014. (Year: 2014).*

*Primary Examiner* — Abdullah Al Kawsar
*Assistant Examiner* — David V Luu
(74) *Attorney, Agent, or Firm* — David H. Judson

(57) ABSTRACT

Mobile devices, such as a smartphone, tablet or wearable, are leveraged to facilitate remote support between a user of the device, and a remote technician. In this approach, the mobile device is used as a tool on behalf of the remote technician. In particular, and in one embodiment, the mobile device is used to transfer images to the remote technician's desktop. The remote technician desktop is provisioned with a whiteboard functionality by which the remote technical draws on the camera image that the remote technician is then viewing. The resulting annotation(s) are then transferred back over the network and drawn on the end user's camera view. In this manner, the technician highlights any area of the camera image, and those highlights are visible on the end user mobile device regardless of whether the local end user rotates the view or moves the mobile device camera during the support session.

10 Claims, 6 Drawing Sheets

(56) References Cited

U.S. PATENT DOCUMENTS

| | | | |
|---|---|---|---|
| 2015/0040074 A1* | 2/2015 | Hofmann | G06T 19/006 715/852 |
| 2016/0029216 A1* | 1/2016 | Gonsalves | H04W 12/06 455/411 |
| 2016/0149970 A1* | 5/2016 | Jacquemot | H04L 65/403 709/204 |
| 2016/0173816 A1* | 6/2016 | Huenerfauth | G06Q 10/20 348/14.02 |
| 2017/0048286 A1* | 2/2017 | Ichihashi | H04N 7/15 |

* cited by examiner

602

SCALE

| 5 | 0 | 0 |
|---|---|---|
| 0 | 5 | 0 |
| 0 | 0 | 1 |

| X | Y | 1 |
|---|---|---|

| X' | Y' | - |
|----|----|---|

X' = X * 5 + ~~Y * 0~~ + ~~1 * 0~~
Y' = ~~X * 0~~ + Y * 5 + ~~1 * 0~~

604

ROTATE AROUND ORIGIN WITH Φ ANGLE

| cos Φ  | sin Φ | 0 |
|--------|-------|---|
| -sin Φ | cos Φ | 0 |
| 0      | 0     | 1 |

| X | Y | 1 |
|---|---|---|

| X' | Y' | - |
|----|----|---|

X' = X * cos Φ - Y * sin Φ + ~~1 * 0~~
Y' = X * sin Φ + Y * cos Φ + ~~1 * 0~~

REMOTE SUPPORT SERVICE WITH SMART WHITEBOARD

BACKGROUND

Technical Field

This disclosure relates generally to remote support technologies, products and services.

Background of the Related Art

Remote access technologies, products and systems enable a user of a remote computer to access and control a host computer over a network. Internet-accessible architectures that provide their users with remote access capabilities (e.g., remote control, file transfer, display screen sharing, chat, computer management and the like) also are well-known in the prior art. Typically, these architectures are implemented as a Web- or cloud-based "service," such as LogMeIn®, GoToMyPC®, WebEx®, Adobe® Connect, and others. For basic "remote access," an individual who uses the service has a host computer that he or she desires to access from a remote location. Using the LogMeIn software-as-a-service (SaaS), for example, the individual can access his or her host computer using a client computer or mobile device that runs a web browser or a mobile app. Such technologies also are leveraged to facilitate other network-based services, such a remote technical (IT) support, wherein a support technician connects to a local user's computer or mobile device to view, diagnose and fix some (local) technical problem, all from a remote location. LogMeIn Rescue™ is a representative service of this type. Remote support tools such as these can successfully help people fix their computer, smartphone and other connected device issues. These support solutions, however, typically are only used to address particular technical issues and problems existing on the end user connected device itself.

There are many instances where it would be desirable to provide remote technical support or other such assistance and in which the local user (seeking that support) has a problem other than one involving his or her computer or other connected device. Some examples might be a user who seeks aid in fixing a broken pipe in his or her home, a user who sees help in assembling a piece of modular furniture, a user who is having difficulty installing or fixing an appliance, or many others. Another common use-case would be when an on-site (the local) technician is not able to solve a problem alone, thus requiring a field expert's knowledge.

It would be desirable to facilitate technical support sessions in these contexts.

BRIEF SUMMARY

Mobile devices, such as a smartphone, tablet or wearable, are leveraged to facilitate a remote support session between a user of the device, and a remote technician. Instead of the usual remote support paradigm where the remote technician diagnoses technical issues on the local device itself, the local device preferably is used as a tool on behalf of the remote technician. In particular, and in one embodiment, the mobile device is used to transfer images (e.g., preferably in the form of a "live" camera-generated video stream) to the remote technician's desktop. The remote technician desktop is provisioned with a "smart whiteboard" functionality by which the remote technical draws on "top" of the camera image that the remote technician is then viewing. Using this whiteboard function, the remote technician highlights some aspect of the camera view. The resulting annotation(s) are then transferred back over the network and "drawn" (or, more generally, overlaid) on the end user's camera view. In this manner, the technician can highlight any area of the camera image, and those highlights are then visible on the end user mobile device regardless of whether the local end user rotates the view or moves the mobile device camera during the support session. Using the underlying remote support infrastructure or conventional voice technologies, the technician also can "chat" or speak with the end user in real-time as the annotations are displayed locally, in effect "walking" the end user through the support session.

The approach takes advantage of the (typically) relatively greater processing power of the technician's desktop compared to the mobile device, which has the burden of generating and providing the image feed. The live video stream of the end user's camera provides on-site "eyes" for the remote technician (expert), and the local display of the technician's image markup in effect provides on-site "hands" for the local user. Thus, the system and method of this disclosure provides enhanced remote support for any type of local problem or issue, preferably by capturing the technician's static annotations via real-time image recognition capabilities of the technician's desktop and then delivering those annotations for display locally on the mobile device. In this way, and using the annotations as a guide, the supporter instructs the supportee, e.g., to execute one or more steps to fix the problem or otherwise address the outstanding issue or question(s). The approach provides a new paradigm for remote support, regardless of the problem being addressed.

The foregoing has outlined some of the more pertinent features of the subject disclosure. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

According to one embodiment of this disclosure, a mobile device user operates as the "eyes" of a remote technician by providing an image feed (one or more image frames, preferably, as a live video stream) of some local (to the end user) scene. Mobile devices, such as a smartphone, tablet or wearable (e.g., Apple iPhone® and iPad® tablet, Google® Glass™, and others), may be used for this purpose. To this end, the mobile device includes a remote access/support client application, such as LogMeIn Ignition™, which is augmented to provide the functionality described herein. The client application may be downloaded and installed via a mobile application delivery service, such as the Apple® App™ Store, Android™ Market (or equivalents), or it may be provided as a native application to a connected device. In one embodiment, the client application is augmented according to this disclosure to provide the session support of this disclosure, and this functionality may be implemented in any convenient manner, e.g., using an applet, an ActiveX control, native code, plug-ins, or the like.

Figure 1:
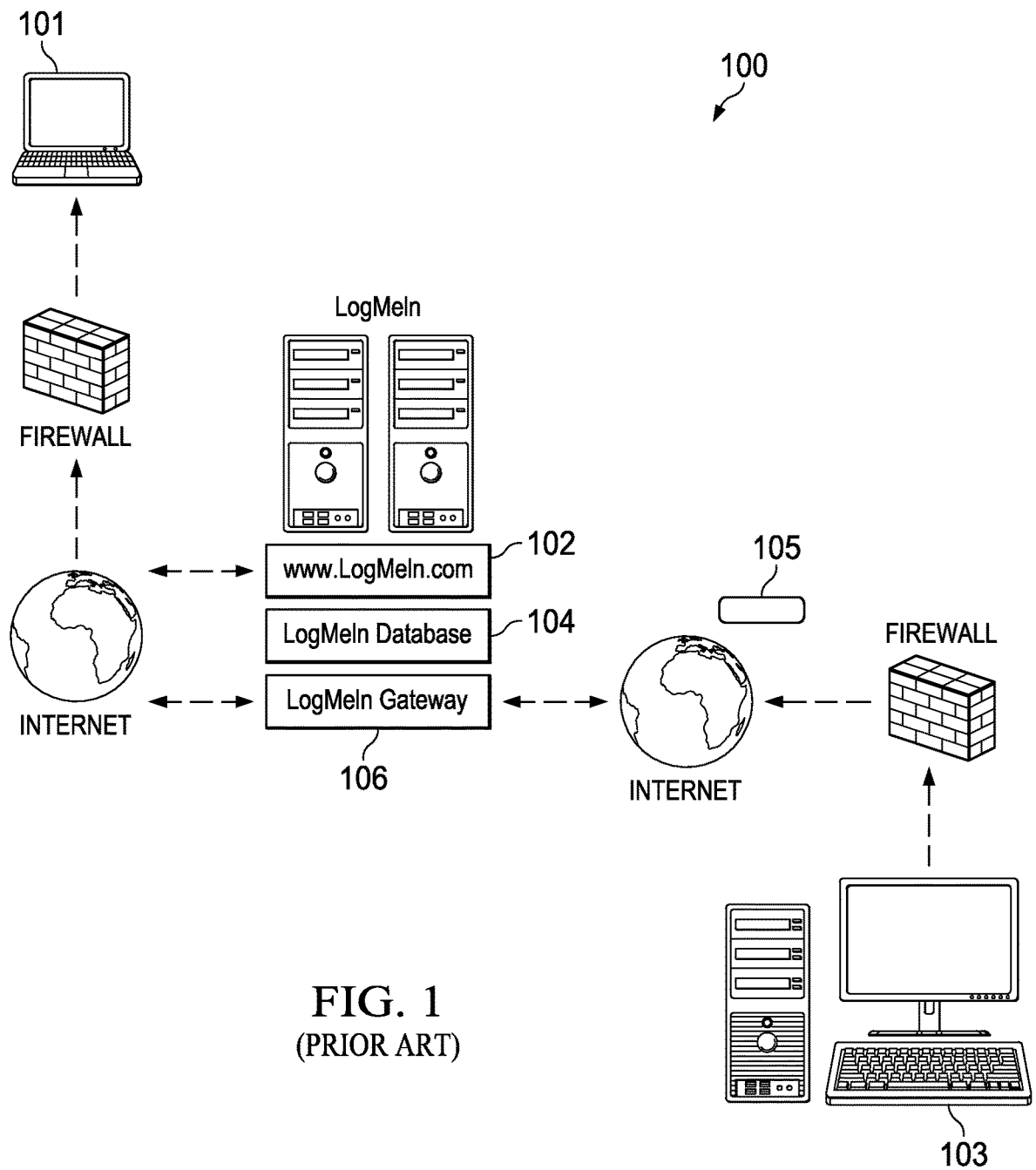
FIG. 1 depicts an extensible Web- or cloud-based remote access and on-demand technical support architecture platform that may be used to facilitate the techniques of this disclosure.

FIG. 1 illustrates a high level view of an on-demand remote support architecture 100 in which the disclosed technique may be practiced. This architecture is merely representative, and it should not be taken as limiting. Preferably, the architecture comprises "n-tiers" that include a web server tier 102, a database tier 104, and a gateway tier 106. The web server tier 102 comprises a plurality of machines that each executes web server software. The web server tier provides an Internet-accessible web site. Preferably, the web site associated with a site domain (however designated) is available from multiple locations that collectively comprise the web server tier 102. The database tier 104 comprises a plurality of machines that each executes database server software. The database tier provides a network-accessible data storage service for generating and storing data associated with end user sessions to the remote access service. The gateway tier 106 comprises a plurality of machines that each executes application server software. The gateway tier provides a network-accessible connection service for establishing and maintaining connections between and among the participating end user computers. Although not shown, preferably end user computers connect to the gateway servers over secure connections, e.g., over SSL, TLS, or the like. A representative machine on which the web server, database server or gateway server executes comprises commodity hardware (e.g., one or more processors) running an operating system kernel, applications, and utilities.

Generalizing, one or more functions of such a technology platform may be implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

Figure 2:
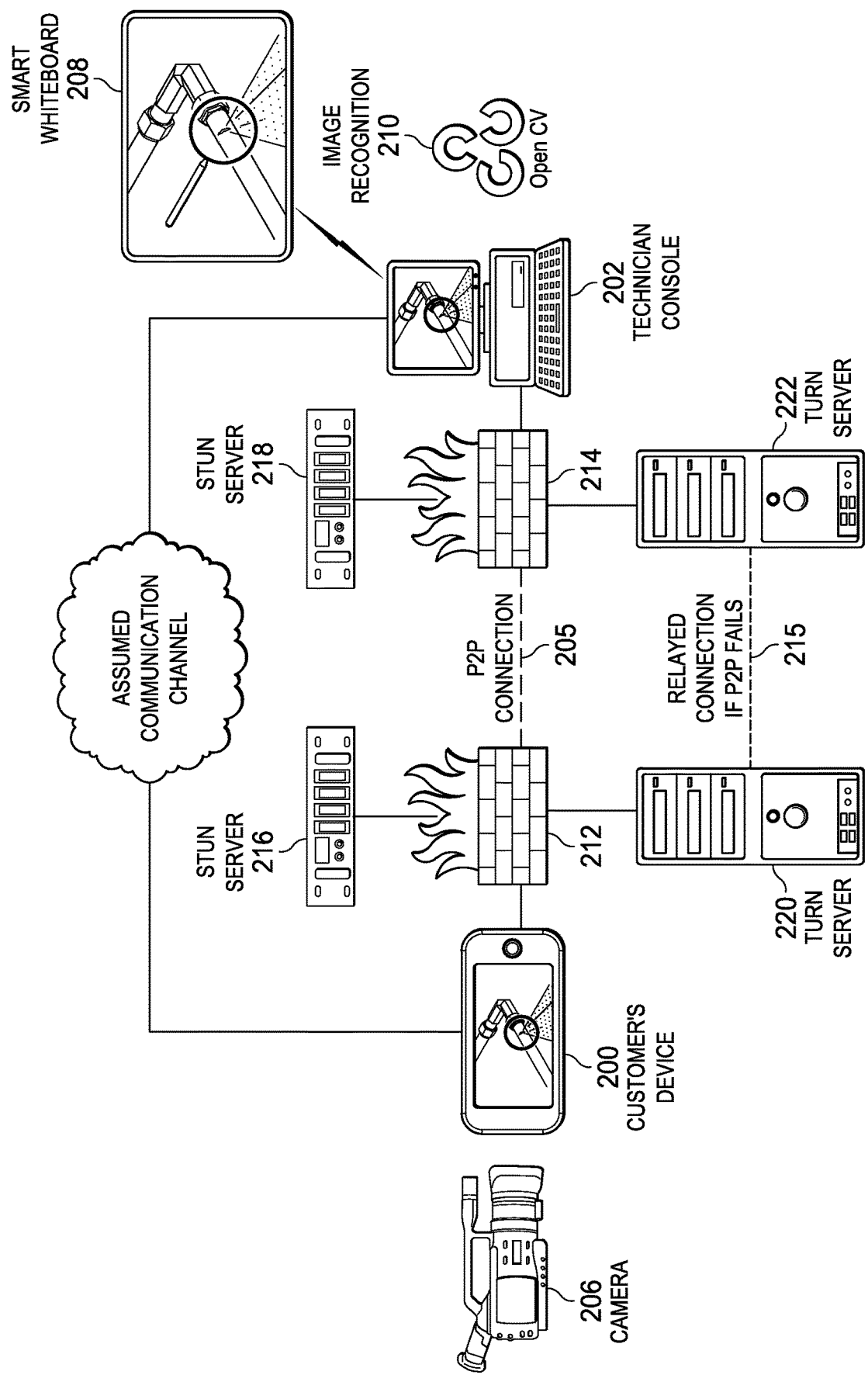
FIG. 2 is an illustrative remote support use case in which a mobile device user desires assistance from a remote technician to address a problem or issue local to the device user.

FIG. 2 depicts a representative remote support use case in which a mobile device user desires assistance from a remote technician to address a problem or issue local to the device user according to this disclosure. In this system, the local user (supportee, customer, end user, etc.) operates mobile device 200, and the remote technician (supporter, expert, helper, engineer, etc.) operates a technician desktop machine 202. In this example scenario, the mobile device 200 connects to the technician machine 202 via an "assumed communication channel" 204. That channel is highly simplified. Typically, it includes a radio access network (RAN), other mobile networks, gateway(s), and the like; the technician desktop machine 202 likewise connects through one or more networks as required. Conveniently, the remote support infrastructure may be positioned with the assumed communication channel 204 so that one or more of the services, functions and features of that infrastructure may be utilized. Thus, for example, the remote support infrastructure may be used to provide chat, screen-sharing, collaboration, remote access, and so forth. The support representative uses a technician console application (e.g., LogMeIn Rescue) to handle support sessions. More generally, the assumed communication channel can support any arbitrary protocol.

According to this disclosure, and as noted above, a camera view of the end user's mobile device 200 preferably is transferred in real-time to the technician's display screen via a direct (peer-to-peer or "P2P") connection 205. Preferably, the stream delivery (video encoding and decoding, etc.) conforms to the WebRTC standard, although this is not a requirement. To this end, the mobile device 200 includes camera 206, and the image(s) captured by the camera, typically as a live video feed, are then available at the technician console. If either the mobile device 200 or the technician machine 202 is located behind a firewall or NAT device 212 or 214, then establishing the P2P connection requires that each component knows the other's public IP address. To this end, one or more STUN-based servers may be used. As depicted, mobile device 200 interacts with an associated STUN server 216, while the technician machine interacts with the STUN server 218. STUN server(s) 216 and 218 may be implemented as a single server or server system. The STUN server is assumed to be reachable over the publicly-routed Internet. The mobile device 200 uses STUN server 216 to obtain the public IP address of the technician machine 202, and machine 202 uses STUN server 218 to obtain the public IP address of the mobile device. If the P2P connection 205 cannot be established (e.g., due to a firewall), a TURN relay service may be utilized. In particular, and as depicted, the TURN relay service (e.g., Apple® FaceTime®) comprises TURN server 220, and TURN server 222, which cooperate in a known manner to provide an alternative connection 215 that is used to provide the video stream in the event the P2P connection fails.

Other techniques may be used to communicate the live video feed to the support technician's computing machine. Another alternative approach is to use a dedicated media server infrastructure that can provide various video delivery support services and technologies. Thus, for example, the media server(s) may provide a one-to-many video bridge, video-conferencing, and the like, by which multiple individuals can view the image (and the overlay annotations) as well. This enables multiple users to collaborate with respect to the support session as desired.

A typical workflow of the support session then proceeds as follows. The customer having an issue contacts the support representative (e.g., by telephone, VoIP, chat, or otherwise) at the technician machine 202. If necessary, the representative advises the customer to install the mobile app if not already present on the mobile device 200. A support session is established between the customer and the support technician. The mobile device camera is activated by the user. The technician starts the live video streaming of the mobile device's camera on his or her technician console. As noted above, preferably the live images are transferred from the mobile device to the technician machine using WebRTC-based transfer, using P2P or relayed by the TURN service.

Once the support session setup is carried out in this manner, the technician can then provide additional "hands-on" support according to the techniques of this disclosure despite being located remotely. To this end, the technician identifies the problem and highlights an area to be addressed (or an action to be taken with respect thereto) using a smart whiteboard 208. The smart whiteboard is an application or utility that executes in or in association with the technician console. It provides an overlay on which the technician can draw and thereby annotate whatever image is being rendered underneath. As will be described, the whiteboard annotation is then captured at the technician's machine and delivered over the P2P connection (or otherwise, over the assumed communication channel, or over some other channel) to the mobile device. The application executing on the mobile device receives the annotation data and instantiates the annotation on the mobile device screen, once again as an overlay. In this manner, the technician sees what the end user sees, and the end user receives direct and targeted support in the form of the technician's "hands" actually drawing on the image. Thus, for example, if the end user is trying to locate some feature of a product he or she is holding, the technician can draw a circle around that feature, with the circle then visible on the mobile device itself. This enables the technician to provide guided support as if he or she were physically present with the user.

Thus, according to this disclosure, preferably a P2P communication channel between the end user and the technician is established, and this channel is then used to provide real-time video support. Using the smart whiteboard on the technician side, the user's experience is enhanced by having the support engineer highlight one or more particular areas on the camera image, and then re-drawing those highlight(s) on the end user's local device in real-time.

Figure 3:
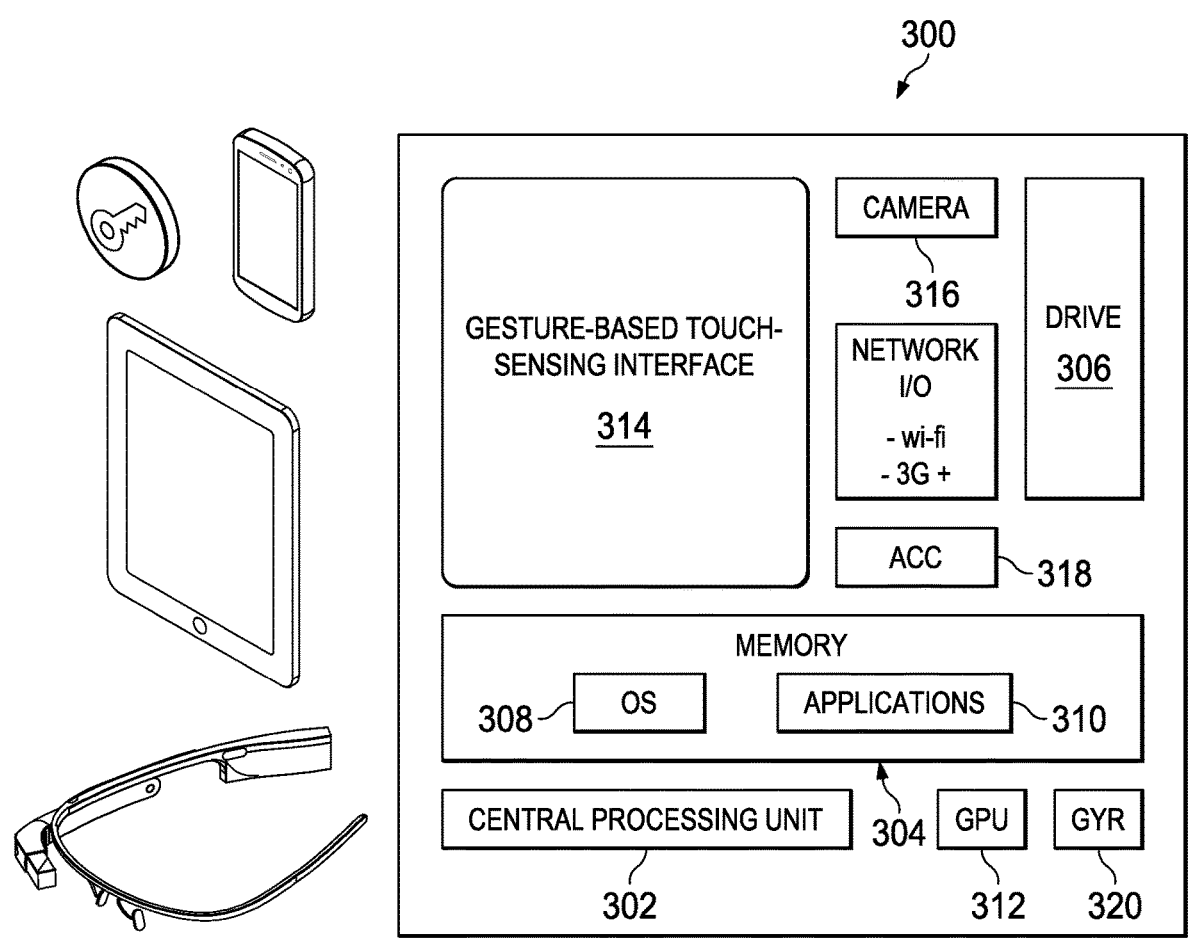
FIG. 3 is an exemplary block diagram of a mobile device that is used to extend or augment a remote support session according to the techniques of this disclosure.

In this example, the mobile device is an Apple iPad® or iPad2, iPad Mini, an Android™-based smartphone or tablet, a Windows®-based smartphone or tablet, Google Glass wearable, or the like. As seen in FIG. 3, a representative mobile device 300 comprises a CPU (central processing unit) 302, such as any Intel- or AMD-based chip, computer memory 304, such as RAM, and a drive 306. The device software includes an operating system (e.g., Apple iOS, Google® Android™, or the like) 308, and generic support applications and utilities 310. The device may also include a graphics processing unit (GPU) 312. In particular, the mobile device also includes a touch-sensing device or interface 314 configured to receive input from a user's touch and to send this information to processor 312. The touch-sensing device typically is a touch screen. The touch-sensing device or interface 314 recognizes touches, as well as the position, motion and magnitude of touches on a touch sensitive surface (gestures). In operation, the touch-sensing device detects and reports the touches to the processor 312, which then interpret the touches in accordance with its programming. The device also comprises a high-resolution camera 316 for capturing images, typically as a live stream, an accelerometer 318, a gyroscope 320, and the like.

Generalizing, the mobile device is any wireless device that has the capability of capturing images, preferably in the form of a live video. Other mobile devices in which the technique may be practiced include any access protocol-enabled device (e.g., a Blackberry® device, an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

In a representative embodiment, the mobile device is a cellular telephone that operates over GPRS (General Packet Radio Service), which is a data technology for GSM networks. In addition to a conventional voice communication, a given mobile device can communicate with another such device via many different types of message transfer techniques, including SMS (short message service), enhanced SMS (EMS), multi-media message (MMS), email, WAP, paging, or other known or later-developed wireless data formats. Generalizing, a mobile device as used herein is a 3G-(or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

The remote access client is not limited to a mobile device, as it may be a conventional desktop, laptop or other Internet-accessible machine or connected device having the image-capture functionality (or that can interact with a device that has such capability).

Smart Whiteboard

The problem of maintaining the annotations in the proper position relative to the image is a complex technical challenge, as the end user typically will be holding his or her mobile device and presumably moving it, rotating it, etc. The subject disclosure addresses and solves this problem as now explained.

As described above, the "smart" whiteboard feature makes it possible for the technician to highlight one or more areas on the camera view. By receiving and forwarding (to the mobile device) the annotation(s), the whiteboard helps unambiguously identifying the target object, e.g. one particular button on a control panel, or the appropriate type of screw or nut, etc., depending on the support task at issue.

Figure 4A:
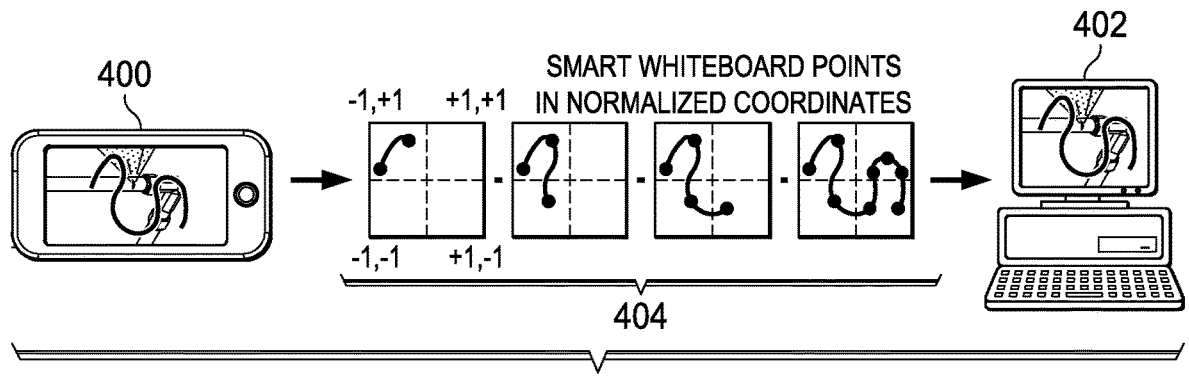
FIG. 4A-4C illustrates how the smart whiteboard functionality is used to facilitate the remote support session according to this disclosure.
Figure 4B:
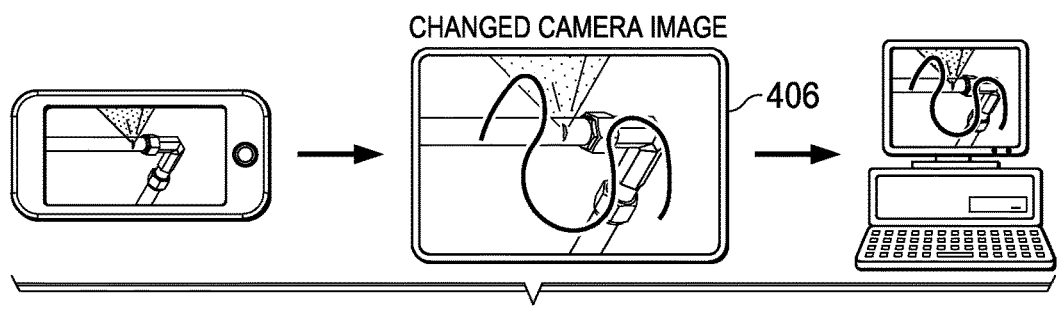
Figure 4C:
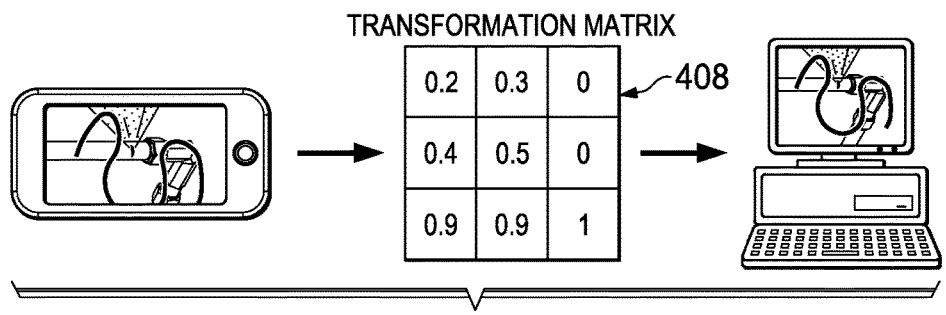

With reference to FIG. 4A-4C, the following steps explain the mechanism. It is assumed that the mobile device 400 is in communication with the technician console 402, in the manner explained above, and that the mobile device is actively sending the live video stream. Thus, the image seen by the camera is rendered on the technician console. It can be seen that the image is moving, e.g., because the user is moving relative to the target object of interest, because the camera is rotating relative to that object of interest, because the user's arm holding the camera is un-steady, or otherwise. Because of such movements, there must be some mechanism to align whatever highlight(s) are drawn at the console 402 with what is actually seen on the mobile device 400. This alignment must occur in real-time (or as close thereto as possible) so that the support session can proceed efficiently and effectively.

To that end, and as seen in FIG. 4A, the support engineer selects the whiteboard tool and starts drawing on the camera image. The tool may be a physical device (e.g., a light pen, a pointer, the user's finger, etc.) or a virtual one generated by the technician console on a transparent overlay situated on the display screen (or a portion thereof). Further details of the overlay are described below. The drawing created by the technician is then stored as a sequence 404 of connected points. Preferably, the drawing is captured by real-time image recognition software executing in or in association with the machine 402. This software may be OpenCV 210, such as shown in FIG. 2.

Thus, as shown in this representative example, a first box (of the sequence) shows a pair of connected points, the second box shows a next pair of connected points, the third box shows a still next pair, and so forth. According to this disclosure, preferably each point's (X,Y) coordinates are transformed (normalized) into a coordinate system whose origin is the center of the image. In both axes, preferably the range that covers the whole image goes from −1.0 to +1.0. According to this convention, the top-left corner is at −1.0, −1.0, and the bottom-right is t+1.0, +1.0. Other normalizations schemes may be used. WebRTC technologies typically include an algorithm that reduces the quality of the transferred camera image if the bandwidth is not sufficient, or if the processing or storage resources of either the sender or the receiver are limited. One technique to achieve this is decreasing the resolution of the image. By storing the connected point(s) coordinates in this normalized form as has been described, the whiteboard drawing can be correctly displayed disregarding the actual resolution.

As shown in FIG. 4A, the normalized coordinates are continuously sent from the technician's console 402 (where the annotation(s) are captured) to the mobile device 400, where the drawing is then built up from them, preferably exactly the same way as on the technician's side, with the result then being drawn on the top of the camera's view on the mobile device display screen. As seen in FIG. 4B, the camera images of the mobile device are being continuously sent to the technician's computer. Preferably, and after every received frame, an image recognition algorithm is run on the technician's computer; this operation advantageously computes the movement (e.g., side movement, movement towards or away from the target, rotation, etc.) of the mobile device compared to a previous frame. From these computed values, a linear transformation is then calculated. The linear transformation is a set of data that is useful to maintain alignment between the image being captured on the mobile device, and the local annotation(s) being overlaid on that image. In other words, the whiteboard coordinates (of the connected points) can be linearly transformed by this transformation to thus remain properly positioned relative to the original highlighted area as first drawn on the mobile device side. To that end, the linear transformation is updated and preferably stored in a 3 by 3 element matrix 408. This data set is then provided over the communication channel to the mobile device, as shown in FIG. 4C. Upon receipt of the transformation matrix, the whiteboard coordinates are multiplied by this matrix before the whiteboard is drawn again, thereby maintaining proper position and orientation of the highlight.

Preferably, the transformation matrix 408 is generated on the support technician's side of the communication, as the tasks required to create this matrix (namely, image recognition, image analysis, movement computations, etc.) are much more computationally-intensive as compared to the computations needed on the mobile device to render (or re-render) the annotation(s). Thus, the size and complexity of the software necessary to provide this support on the mobile device may be significant reduced.

As noted, the transformation matrix 408 is sent back to the mobile device 400 which transforms the whiteboard coordinates (with the same matrix multiplication) before they are drawn on the screen. Preferably, the smart whiteboard stores contiguous lines separately. For example, if the technician highlights three different objects with three separate lines, and then the camera is moved in the 3D space, the three drawings typically implement distinct transformations to stay in place. In part, this type of separate processing is desired to improve the final appearance of the highlights on the mobile device due in part to the fact distant objects move slower compared to closer ones from the camera's 2D perspective. If the image processing algorithm is able to calculate different transformation matrices for each object, they can be used during the drawing and sent to the mobile device independently.

Figure 5:
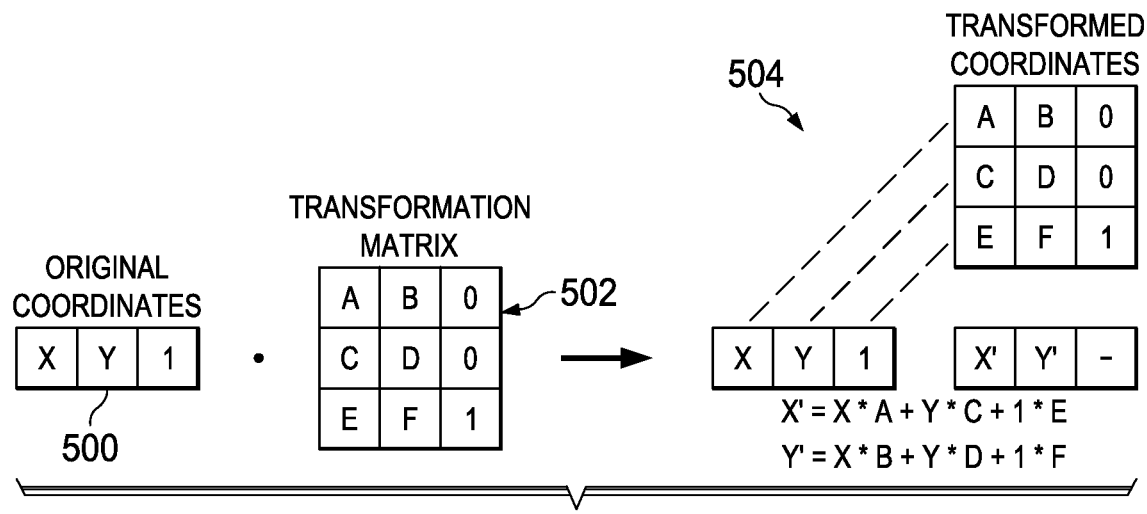
FIG. 5 illustrates the basic operation of the transformation matrix on a data set of original coordinates.
Figure 6A:
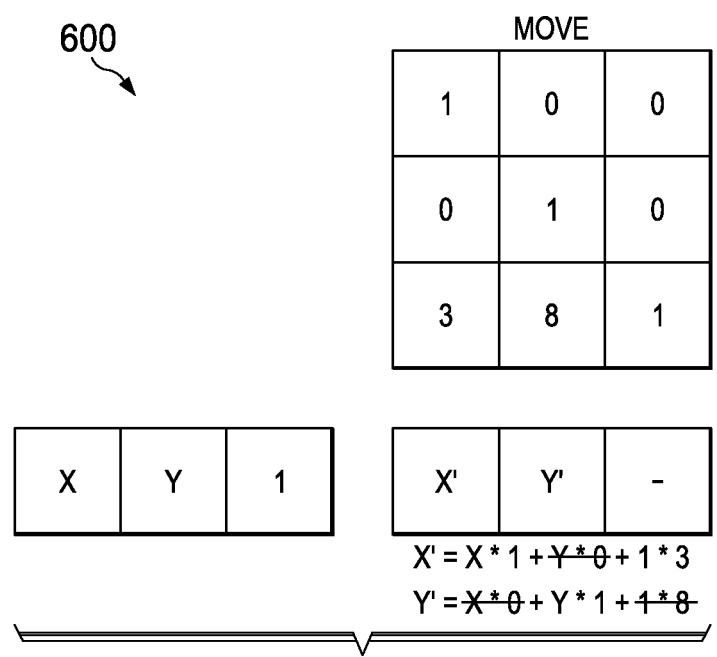
FIG. 6A-6C illustrates several example transformation matrices that may be implemented to respond to various types of motion and rotation with respect to the mobile device camera view.
Figure 6B:
Figure 6C:

As further detail regarding the smart whiteboard functionality of this disclosure, FIG. 5 illustrates the basic operation of the transformation matrix on a data set of original coordinates. In this example, the original coordinates 500 are transformed by transformation matrix 502 to generate the transformed coordinates 504. As can be seen, the transformation matrix 502 effects this operation by a matrix multiplication over the original coordinates using the matrix elements. Typically, there will be different types of matrix element values required for the different types of translations that occur at the mobile device camera view. Typically, the transformation matrix (such as shown in FIG. 4 as 408) is computed in such a manner so as to aggregate the relevant element values such that only one matrix is delivered over the wire per segment (between coordinate points). For simplicity of illustration, however, FIG. 6A illustrates a sample transformation matrix for a "move" operation 600 (a linear movement of some aspect of the camera view), FIG. 6B illustrates a sample transformation matrix for a "scale" operation 602 (a scaling of some aspect of the camera view), and FIG. 6C illustrates a sample transformation matrix for a "rotate around origin" operation 604 (with respect to the camera view). There may be additional operations.

Because matrix multiplication is used, and as depicted, the right-most column of each transformation matrix will include the same {0, 0, 1} vector. In FIG. 6A, the transformation matrix also includes a diagonal unity-valued vector {1, 1, 1}; with these pre-configured values, the move is then carried out with respect to the values of the elements in the lower two cells (in this example, the values "3" and "8" corresponding to the transformed X and Y values). In other words, the values in these elements represent the {X, Y} extent of the particular move operation represented. In FIG.

6B, the scaling operation, except for the right-most column as described, all additional elements have zero values except for the diagonal vector, which includes the scaling factor (in this example, {5, 5, 1}). In FIG. 6C, the sine and cosine values are present in the elements as shown, with the right-most column as described and the remaining cells being zeros. As noted above, and depending on the nature and extent of the movement and rotation, the individual transformation matrices are computed and the element values aggregated (i.e., "consolidated") to produce the final result (e.g., matrix 408 in FIG. 4) that is sent across the wire for the update to a particular segment. Stated another way, the matrix 408 represents a complex transformation matrix that is computed based on one or more simple transformation matrices representing the individual actions such as shown by example in FIGS. 6A-6C.

As a variant embodiment, the movement detection can be enhanced by combining the image processing algorithm's result with other data, such as data from the mobile device's accelerometer and gyroscope (if present). In such case, of course this data must be delivered first to the technician's computer. If the mobile device is provisioned to provide this data, it may be delivered with the camera images over the WebRTC data flows.

Preferably, the annotations are implemented in the following manner. Each side of the connection includes application functionality executing in the respective machine. When the annotation function is selected (e.g., on the technician's desktop), the application interacts with underlying operating system resources. In response, preferably the local operating system (OS) opens a transparent, empty window that is set on top of whatever else is then displayed on the machine. The application then receives the data defining the annotation as has been described above. In like manner, the mobile device application has the ability to interact with the underlying operating system to render the transparent, empty window. Once the transformation matrix functionality is implemented across them in the manner described, the machines in the support session in effect have a common coordinate system. Thus, the machine 402 initially sends its drawing parameter data to the mobile device 400, and the latter draws the annotation(s) locally. As image frames are received, the transformation matrices are generated and sent back over the wire, and the transformation(s) are applied continuously. The annotation(s) on then re-drawn on the mobile device transparent layer running locally.

The smart whiteboard feature as described above may be used in the opposite direction. In this scenario, the user highlights areas by drawing on the mobile device's screen, just like the technician does on the technician console. In such case, the user's drawing is sent back to the technician, and in this way he or she is able to see what the user marked. The drawing may be enhanced with the same image recognition algorithm as described, so the highlights stay in-place.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

The described commercial products, systems and services are provided for illustrative purposes only and are not intended to limit the scope of this disclosure.

The techniques herein provide for improvements to technology or technical field, namely, on-demand remote access and support environments, as well as improvements to various technologies such as whiteboards, image capture, image transfer, data transformations that support data transfer over a wide area network, and the like, all as described.

Having described our invention, what we now claim is as follows.

The invention claimed is:

1. Apparatus having a display interface, comprising:
a processor;
computer memory holding computer program instructions executed by the processor during a remote support session established with a user of a mobile device, the computer program instructions operative to:
receive and render on the display interface a first image frame of a live video stream, the first image frame having been generated from a camera of the mobile device;
open a transparent, empty window on the display interface overlaying the first image frame;
capture data input on the transparent empty window, the captured data representing an annotation drawn over the first image frame being displayed on the display interface, wherein the annotation is positioned relative to an object within the first image frame;
store the annotation as a sequence of connected points, each point having an (X,Y) coordinate normalized with respect to a coordinate system whose origin is at a center of an image depicted in the first image frame, and wherein normalized values within the coordinate system have maximum values at an outer perimeter of the image depicted in the first image frame;
output the captured data to the mobile device to enable a representation of the annotation to be reproduced on a display interface of the mobile device;
as a second image frame of the live video stream distinct from the first image frame is received from the mobile device, detecting from comparing the second image frame and the first image frame that a movement of the mobile device has occurred;
in response to the detection, compute transformation data representing a movement of the mobile device relative to the object in a prior image frame generated at the mobile device, the transformation data being a composite of individual transformation matrices each of which is computed in association with an individual movement of the mobile device relative to the object that is one of: a move operation, a scaling operation, and a rotate around origin operation, the composite of individual transformation matrices being computed for the object by aggregating into a single matrix corresponding element values of the individual transformation matrices; and output the transformation data to the mobile device over a peer-to-peer connection established with the mobile device to enable the annotation to be re-drawn in real-time such that the position of the annotation relative to the object is maintained.

2. The apparatus as described in claim 1 wherein the computer program instructions are further operative to:

receive accelerometer or gyroscope data generated at the mobile device, and to compute the transformation data based at least in part on the accelerometer or gyroscope data received.

3. The apparatus as described in claim 1 wherein the mobile device is one of: a smartphone, a tablet, and a wearable.

4. The apparatus as described in claim 1 wherein the remote support session is implemented over a WebRTC-based peer-to-peer communication channel that traverses at least one NAT device.

5. Mobile device apparatus having a camera, comprising:

a processor;

computer memory holding computer program instructions executed by the processor during a remote support session established with a support computing entity, the computer program instructions operative to:

render on a display interface at least a first image frame of the live video stream, the first image frame captured by the camera;

output to the support computing entity the first image frame captured by the camera;

receive data from the support computing entity, the data being a representation of an annotation, the annotation having been drawn on a transparent, empty window opened up at the support computing entity and overlaid over the first image frame as the first image frame is displayed at the support computing entity, the annotation having been stored at the support computing entity as a sequence of connected points, each point having an (X,Y) coordinate normalized with respect to a coordinate system whose origin is at a center of an image depicted in the first image frame, and wherein normalized values within the coordinate system have maximum values at an outer perimeter of the image depicted in the first image frame;

render on the display interface the representation of the annotation, wherein the annotation is positioned relative to an object within the first image frame;

output to the support computing entity a second image frame of the live video stream distinct from the first image frame and captured by the camera, wherein the second image frame indicates that a movement of the mobile device has occurred;

receive transformation data from the support computing entity, the transformation data having been generated at the support computing entity to represent a movement of the mobile device relative to the object in a prior image frame captured by the camera, the transformation data being a composite of individual transformation matrices each of which is computed in association with an individual movement of the mobile device relative to the object that is one of: a move operation, a scaling operation, and a rotate around origin operation, the composite of individual transformation matrices having been computed for the object by aggregating into a single matrix corresponding element values of the individual transformation matrices; and based on the transformation data, re-render on the display interface, in real-time, the representation of the annotation such that the position of the annotation relative to the object is maintained.

6. The mobile device apparatus as described in claim 5, being one of: a smartphone, a tablet, and a wearable.

7. The mobile device apparatus as described in claim 5 wherein the remote support session is implemented over a WebRTC-based peer-to-peer communication channel that traverses at least one NAT device.

8. A method of remote support executed during a support session established between a first computing entity and a second computing entity, comprising:

establishing a direct peer-to-peer connection from the second computing entity to the first computing entity;

receiving and displaying at the second computing entity a first image frame of a live video stream generated at the first computing entity, the live video stream associated with a target object having a support issue;

opening a transparent, empty window on the display interface at the second computing entity overlaying the first image frame;

capturing an annotation drawn on the transparent, empty window over the first image frame, wherein the annotation is positioned relative to the target object within the first image frame;

storing the annotation as a sequence of connected points, each point having an (X,Y) coordinate normalized with respect to a coordinate system whose origin is at a center of an image depicted in the first image frame, and wherein normalized values within the coordinate system have maximum values at an outer perimeter of the image depicted in the first image frame;

forwarding information representing the annotation over the direct peer-to-peer connection from the second computing entity to the first computing entity to enable real-time rendering of the annotation at the first computing entity;

as a second image frame of the live video stream distinct from the first image frame is received from the first computing entity, detecting from comparing the second image frame and the first image frame that a movement of the first computing entity has occurred;

in response to the detecting, compute transformation data representing a movement of the first computing entity relative to the target object in a prior image frame generated at the first computing entity, the transformation data being a composite of individual transformation matrices each of which is computed in association with an individual movement of the first computing entity relative to the object that is one of: a move operation, a scaling operation, and a rotate around origin operation, the composite of the individual transformation matrices being computed for the object by aggregating into a single matrix corresponding element values of the individual transformation matrices, the transformation data applied at the first computing entity to maintain, in real-time, position and orientation of the annotation relative to the target object is maintained irrespective of movement of a camera of the first computing entity relative to the target object.

9. The method as described in claim 8 wherein the first computing entity is one of: a smartphone, a tablet, and a wearable.

10. The method as described in claim 8 wherein the direct peer-to-peer connection is a WebRTC-based connection that traverses at least one NAT device.

* * * * *